United States Patent Office 3,468,051
Patented Sept. 23, 1969

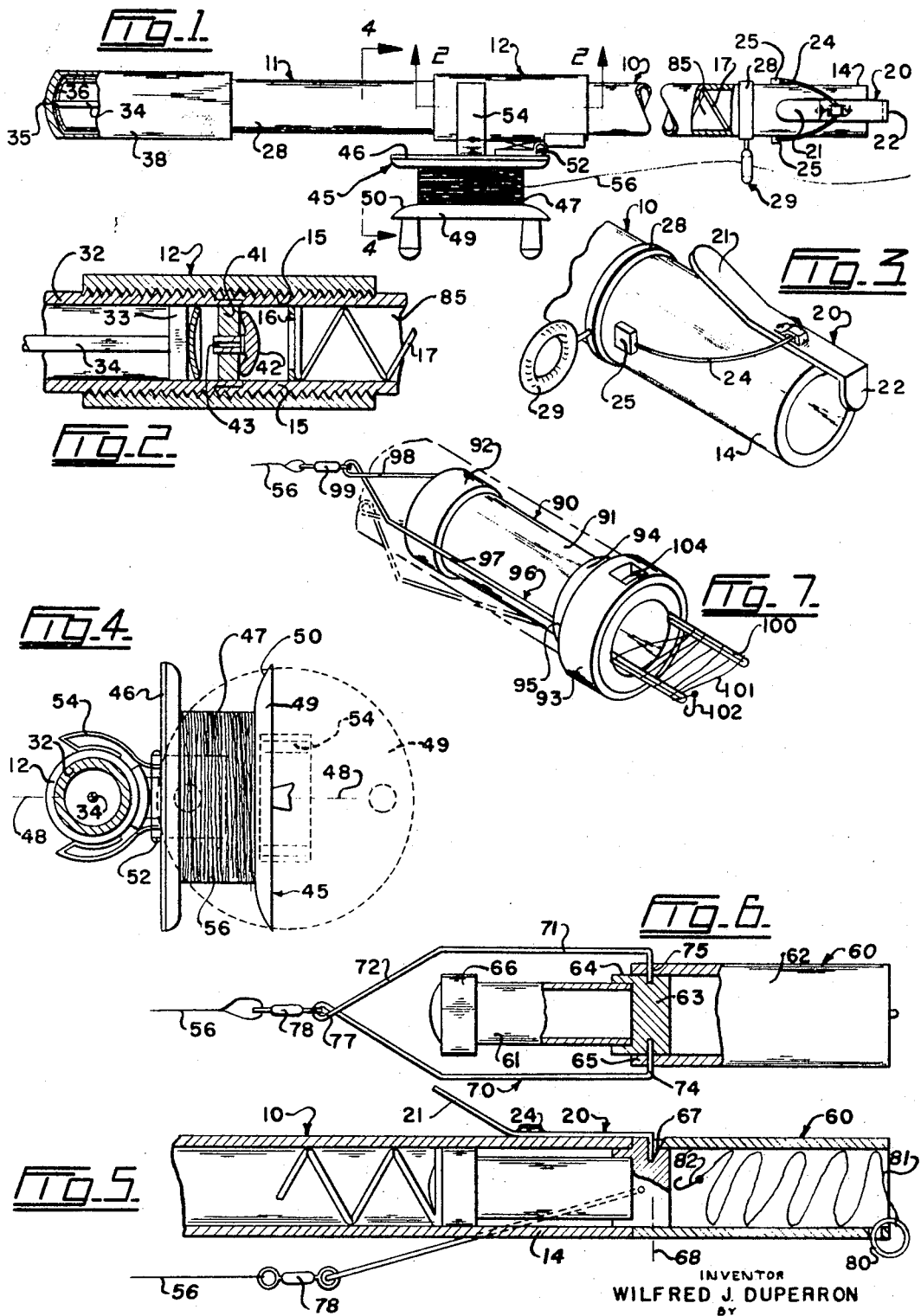

3,468,051
FISHING LINE CASTING DEVICE
Wilfred J. Duperron, 7243 Kingsway, Burnaby,
British Columbia, Canada
Filed July 3, 1967, Ser. No. 650,824
Int. Cl. A01k 91/02
U.S. Cl. 43—19
8 Claims

ABSTRACT OF THE DISCLOSURE

A device having a barrel and a reel-wound fishing line attached to a projectile which can be fired from the barrel by compressed air. The projectile having a plug end sealingly receivable in the outer portion of the barrel. A latch on the outer portion of the barrel releasably holds the projectile against the air pressure within the barrel.

BACKGROUND OF THE INVENTION

This invention relates generally to fishing gear and more particularly to a device for casting a sinker or the like attached to a fishing line.

A considerable amount of skill is required to cast and since so many fishermen lack such skill, attempts have been made to provide mechanical means which will enable a lure for example, to be fired somewhat in the manner as a bullet from a gun. Some of these devices are of quite complicated construction since they are required to be made like a rifle in order to safely fire their explosive charges. Others employ springs and the like to propel the lure but these devices often lack both the distance and accuracy required for casting.

SUMMARY OF THE INVENTION

The present devices include a barrel having an air chamber with a closed inner end and an outer end adapted to be sealed by a line-carrying projectile which is latched to the barrel for release after said barrel is charged with air by means of a hand operated pump. A simple and inexpensive device of this nature is effective and safe to use due, partly to the means for attaching the fish line to the object fired which ensures a straight trajectory. Also, the fish hook is stored on the projectile in such a way that it is unlikely to become snagged during flight. In addition, the winding reel carrying the line is mounted on the device so as to be movable to a position which will allow the line to unwind without rotating the reel and this feature combines with the abovementioned line attaching means to keep the projectile on course.

BRIEF DESCRIPTION OF THE DRAWINGS

FIGURE 1 is a plan of the device, part broken away, in accordance with the present invention, FIGURE 2 is a detail section taken on the line 2—2 of FIGURE 1, FIGURE 3 is a perspective view of the outer end of the barrel, FIGURE 4 is an enlarged transverse section taken on the line 4—4 of FIGURE 1, FIGURE 5 is a longitudinal section, part in elevation, of the projectile fitted to the barrel end, FIGURE 6 is a plan of the projectile with part being shown in section, and FIGURE 7 is a perspective view of a modified projectile.

DESCRIPTION OF THE PREFERRED EMBODIMENTS

As shown best in FIGURE 1, the device includes a cylindrical barrel, generally indicated by the numeral 10, a small air pump, indicated generally at 11, and a sleeve coupling 12 which secures the barrel and pump together in end-to-end relation.

The pump 11 and barrel 10 are shown and described as being constructed as separate components of the device but, obviously, these two parts can be made of a single length of tubing, in which case a flange coupling 12 would not be required.

Barrel 10 has an outer end 14, an inner end 15, and a bore or air chamber 16 between said ends. Near the end 15, the barrel has an internal flange 16, see FIGURE 2, to which flange the inner end of a compression spring 17 is suitably secured, the spring extending along the barrel length to the end 14.

A latch 20 is fitted to the top of the barrel end 14, the latch having an upwardly inclined thumb rest 21 on one end and a downwardly turned keeper 22 on the other end. Latch 20 is secured to the barrel end 14 by a substantially U-shaped spring 24, the ends of said spring being anchored to the sides of the barrel by means of lugs 25. Spring 24 urges the latch 20 into contact with the top of the barrel end 14 so that the thumb rest 21 is disposed at an acute angle to the longitudinal axis of the barrel and the keeper 22 overhangs the extreme outer end of said barrel.

Near the latch 20, the barrel 10 is fitted with a narrow band 28 having a laterally projecting eye 29, the eye being vertically disposed and located on the right side of the barrel.

The pump 11 comprises a cylinder 32, a piston 33, and a piston rod 34 which projects outwardly through an opening 35 in the cylinder head 36, see FIGURE 1 only. A hollow handle 38 is secured to the projecting end of the piston rod 34. The opposite end of the cylinder 32 is fitted with an end wall 41, see FIGURE 2, which carries a diaphragm type valve 42, the valve having a central air outlet port 43. Valve 42 is a conventional one way valve which allows air to be pumped from the cylinder 32 into the barrel 10 but which prevents air flow in the reverse direction. It will be apparent, that wall 41 and valve 42 also provide an inner end closure for the air chamber 16.

Mounted on the right side of the device is a fishing reel, generally indicated by the numeral 45, the reel being shown secured to the sleeve coupling 12 but which may be secured to the barrel end 15. Reel 45 has a base flange 46 on which a winding spool 47 is mounted for rotation about an axis of rotation indicated by the chain dotted line 48 in FIGURE 4. The winding spool 47 has a flange 49, the inner edge of which is rounded as indicated by the numeral 50. The non-rotating base flange 46 of the fishing reel is secured to the sleeve coupling 12 by a hinge 52, said hinge being vertically disposed to permit swinging movement of the reel between the solid and dotted line positions shown in FIGURE 4 of the drawings. A spring clip 54 is fitted to the base flange 46 to permit the reel to be releasably secured to the sleeve coupling 12 when in the solid line position. A fishing line 56 is wound upon the spool 47, the free end of said line being threaded through the eye 29 carried by the outer end of the barrel 10.

Referring now to FIGURES 5 and 6, the numeral 60 indicates generally, one type of projectile which is adapted to be fired by the present device. This projectile comprises a tail plug 61 and a nose sleeve 62, the plug and sleeve being connected together by a boss 63. The interconnected ends of the plug, sleeve and boss provide the projectile with a shoulder 64 and a stop 65. A gasket 66 is fitted to the inner end of the tail plug 61, the gasket having an outside diameter substantially equal to the inside diameter of the barrel 10. As shown in FIGURE 5 only, the projectile 60 is provided with a recess 67, the recess being formed in the nose sleeve 62 and the boss 63. Preferably, the recess 67 is located approximately above the centre of gravity of the projectile, this centre being represented by the chain dotted line 68 of FIGURE 5.

Fitted to the projectile 60 is a wire bail 70 having side portions 71 and a tail end portion 72. The side portions 71 have inwardly directed ends 74 which are rotatably received in openings 75 formed in the overlapping portions of the sleeve 62 and the boss 63. Thus, the bail 70 is rotatably secured to the projectile slightly to the rear of the projectile's centre of gravity 68. The tail end portion 72 of the bail is provided with an eye 77 which is fitted with a swivel 78, the fishing line 56 being secured to this swivel.

The extreme outer or leading end of the nose sleeve 62 is fitted with a ring 80 to which a suitable length of leader 81 is secured. A fish hook 82 is tied to the opposite end of the leader 81.

To prepare the device to cast the fish line 56, the leader and hook are stored within the nose sleeve 62 as shown in FIGURE 5. The projectile 60 is then fitted to the end 14 of the barrel and this is accomplished by first swinging the bail 70 downwardly so that it is disposed at an acute angle to the longitudinal axis of the projectile. This position of the bail enables the tail plug 61 to be entered into the barrel end 14. When the projectile is so inserted, the shoulder 64 bears against the inner surface of the barrel and the stop 65 abuts the extreme outer end of said barrel. At the same time, the gasket 66 forms a sufficiently snug fit with the inner surface of the barrel to provide an air tight seal for the chamber 16. Entry of the tail plug 61 into the barrel end, compresses the spring 17 slightly and when the keeper 22 is snapped into the recess 67 by the action of the spring 24, the compression spring 17 exerts a slight outwardly directed pressure which combines with the action of the latch 20 to keep the projectile 60 firmly lodged in the end of the barrel. The fishing reel 45 is then swung to the dotted line or casting position shown in FIGURE 4, which movement disposes the axis of rotation 48 parallel to the longitudinal axis of the barrel 10 and places the flange 49 forward of the flange 46.

It will be recalled, the wall 41 and valve 42 provide a sealed closure for the inner end of the barrel 10. When the projectile is fitted to the outer end of the barrel as above described, this end of the barrel is also sealed. Thus, chamber 16 is made substantially air tight and when the pump 11 is operated to charge said chamber with air at a suitable pressure, the casting device is ready for firing.

The fisherman supports the device by gripping the pump in his right hand and then aims the barrel at the site in the water selected for fishing. With the thumb of his left hand, the fisherman then depresses the latch 20 to raise the keeper 22 out of the recess 67 and the projectile is then propelled, by the compressed air within the chamber 16, out of the barrel 10. As the projectile leaves the end of the barrel, the bail 70 tends to swing upwardly so that the tail end portion 72 extends across the trailing end of the tail plug 61. Since the bail is secured to the projectile rearwardly of the centre of gravity 68, there is little tendency for the projectile to tumble when in flight or stray off course. The projectile maintains a straight trajectory and the leader and hook remain with the nose sleeve 62 so that they cannot become snagged on overhanging branches or the like. As the projectile moves along its flight path, the fishing line 56 is unwound from the spool 47. The unwinding line slides over the rounded edge 50 of the flange 49 and very little resistance is offered to this movement of the fishing line, due to the shape of the flange 49 and the fact that the spool 47 is not required to rotate. Since little or no resistance is offered to the line as it unwinds from the reel, there is little tendency for the projectile to be pulled off course by the trailing line. Thus, there is little likelihood of the fishing line becoming snagged on the reel or breaking during flight of the projectile. When the projectile strikes the water, the leader 81 and the hook 82 with the bait attached thereto, are ejected from the nose sleeve 62 into their normal position of use in the water. The projectile 60 now serves as a weight for the fishing line 56.

To wind in the fishing line 56, the reel 45 is swung inwardly to the reeling-in position shown in solid line in FIGURE 4. The winding spool 47 is then rotated in the normal manner to wind in the line.

It will be noted that the projectile may be made buoyant so as to act as a float rather than as a weight. The hook would be ejected from the nose sleeve of the buoyant float in the same manner and the projectile would remain floating on the surface of the water with the hook suspended therefrom by means of the leader.

Referring now to FIGURE 7, the numeral 90 indicates generally, a modified projectile. This projectile consists simply of a cylindrical plug 91 which is fitted at one end with a gasket 92 and at the opposite end with a flange 93. Flange 93 provides the projectile with a shoulder 94 and a stop 95.

Projectile 90 is fitted with a bail 96 having side portions 97 and a tail end portion 98. Portion 98 carries a swivel 99 to which the fishing line 56 is attached. The side portions 97 extend through the flange 93 and are turned back upon themselves to provide a two pronged fork 100 which projects a short distance forwardly of the leading end of the projectile. A leader 101 is tied to the fork 100 and to a fishing hook 102. Flange 93 has a recess 104 to receive the keeper 22 of the latch 20.

The modified projectile 90 is inserted into the end 14 of the barrel by first swinging the resilient bail 96 to the dotted line position shown in FIGURE 7. This position of the bail enables the plug to enter the barrel end freely with the bail then lightly engaging the underside of the barrel 10. As before, the gasket 92 forms an air tight seal within the barrel and the shoulder 94 and stop 95 engage the barrel end to support the forward end of the projectile. The keeper 22 is entered into the recess 104 and the spring 107 exerts a slight outward pressure to maintain latching engagement. The leader 101 is wound around the fork 100 and the hook 102 is allowed to hang freely therefrom. The modified projectile is fired as previously described and, when it strikes the water, the leader unwinds from the fork. If the leader is not completely unwound at this time, the action of the projectile in the water will eventually unwind it so that the leader and hook hang freely from the fork.

I claim:

1. A fishing line casting device comprising a barrel having a closed inner end, an outer end, and an air chamber therebetween, a reel mounted near the inner end of the barrel and having a fishing line wound thereon, a projectile secured to the free end of the fishing line, said projectile including a nose member portion extending forwardly of the outer end of the barrel and a tail plug portion positioned within the barrel, a gasket on the tail plug portion, said tail plug portion being enterable into the outer end of the barrel with the gasket thereon forming an airtight seal for the air chamber, a leader and a fish hook carried by the nose member portion, a latch mounted on the outer end of the barrel and having a keeper extending across said barrel end, said projectile having a keeper-receiving recess, and an air pump on the inner end of the barrel adapted to pressurize the air chamber behind the projectile.

2. A fishing line casting device as claimed in claim 1, and including a compression spring within the air chamber adapted to be compressed when the tail plug portion of the projectile is entered into the outer end of the barrel.

3. A fishing line casting device as claimed in claim 1, in which said reel is hingedly mounted near the inner end of the barrel and is swingable between a reeling-in position and a casting position, said reel when in the casting position having its axis of rotation disposed substantially parallel to the longitudinal axis of the barrel.

4. A fishing line casting device as claimed in claim 3, and including a spring clip adapted to releasably secure the reel to a barrel part and to resist swinging movement of said reel away from the reeling-in position.

5. A fishing line casting device as claimed in claim 1, in which said nose member portion of the projectile is a sleeve, said leader being secured at one end to the sleeve and having said hook at the opposite end, said leader and hook being adapted to be contained within the sleeve when the projectile is in flight.

6. A fishing line casting device as claimed in claim 1, in which said nose member portion is a fork, and said leader being secured at one end to the fork and having said hook at the opposite end, said leader being adapted to be loosely wound around the fork when the projectile is in flight.

7. A fishing line casting device as claimed in claim 1, and including a bail having side portions and a tail end portion to which the fishing line as attached, said tail end portion normally being aligned with the longitudinal axis of the projectile and being swingable away from said axis to permit the tail plug portion to be inserted into the outer end of the barrel.

8. A fishing line casting device as claimed in claim 7, in which said side portions of the bail are rotatably secured to the sides of the projectile rearwardly of the centre of gravity of said projectile.

References Cited

UNITED STATES PATENTS

| | | | |
|---|---|---|---|
| 560,570 | 5/1896 | Burns | 46—194 |
| 2,773,494 | 12/1956 | Thompson et al. | 124—15 |
| 2,900,972 | 8/1959 | Marsh et al. | 43—6 X |
| 2,923,285 | 2/1960 | Salles | 43—6 X |
| 2,924,211 | 2/1960 | McSwain | 43—19 X |
| 3,255,548 | 6/1966 | Whritenour | 43—19 |

WARNER H. CAMP, Primary Examiner